(12) United States Patent
van Driest et al.

(10) Patent No.: US 8,189,715 B2
(45) Date of Patent: May 29, 2012

(54) RECEIVER FOR RECEIVING DATA SYMBOLS HAVING A SYMBOL PERIOD

(75) Inventors: Hans van Driest, The Hague (NL);
Cornelis Adrianus Henricus Maria van Puijenbroek, Leusden (NL)

(73) Assignee: Greenpeak Technologies B.V., Utrecht (NL)

( * ) Notice: Subject to any disclaimer, the term of this patent is extended or adjusted under 35 U.S.C. 154(b) by 562 days.

(21) Appl. No.: 12/373,243

(22) PCT Filed: Jul. 12, 2006

(86) PCT No.: PCT/NL2006/050173
§ 371 (c)(1),
(2), (4) Date: Jun. 16, 2009

(87) PCT Pub. No.: WO2008/007947
PCT Pub. Date: Jan. 17, 2008

(65) Prior Publication Data
US 2010/0034326 A1 Feb. 11, 2010

(51) Int. Cl.
*H04L 27/00* (2006.01)
(52) U.S. Cl. ........ 375/316; 375/260; 375/262; 375/267; 375/343; 375/346; 375/347
(58) Field of Classification Search .................. 370/203, 370/204, 205, 206, 207, 208, 209, 210; 375/260, 375/262, 267, 343, 346, 347, 349
See application file for complete search history.

(56) References Cited

U.S. PATENT DOCUMENTS

| 6,141,392 A | 10/2000 | Hoshikuki et al. |
| 6,882,619 B1 * | 4/2005 | Gerakoulis ................... 370/209 |
| 7,336,597 B2 * | 2/2008 | Maltsev et al. ............... 370/206 |

FOREIGN PATENT DOCUMENTS
EP 0474491 A2 3/1992

OTHER PUBLICATIONS

Liu, Wei-Lin et al., "Advanced Low-Complexity HIPERLAN Receiver Using Combined Antenna Switching Diversity and Simple Equaliser," IEEE 47th Vehicular Technology Conference, Phoenix, AZ, May 4-7, 1997, vol. 3, No. 47, pp. 2037-2041.

* cited by examiner

*Primary Examiner* — Dhaval Patel
(74) *Attorney, Agent, or Firm* — Fliesler Meyer LLP

(57) ABSTRACT

A receiver and method for receiving symbols having a symbol period with duration SP comprising. N antenna signals are selected equally in time over a symbol period to obtain a combined antenna signal. An autocorrelation is performed on the combined antenna signal to obtain a combined signal. The combined signal is split into the corresponding antenna signal parts and subjected to an integration function. The output of the integration function is used the select the antenna signal with the best signal quality. The invention enables to perform an efficient antenna diversity circuit, which can partially be used for simultaneously preamble detection and frequency offset estimation.

8 Claims, 5 Drawing Sheets

RECEIVER FOR RECEIVING DATA SYMBOLS HAVING A SYMBOL PERIOD

This application is a national stage application that claims priority under 35 U.S.C. 371 to Patent Cooperation Treaty Application No. PCT/NL2006/050173, entitled "Receiver for receiving data symbols having a symbol period," inventors Hans van Driest et al., filed Jul. 12, 2006, and which has been published as Publication No. WO2008/007947, which application is herein incorporated by reference.

FIELD OF THE INVENTION

The present invention relates to a receiver for receiving data symbols having a symbol period In a further aspect, the present invention relates to a method for receiving data symbols having a symbol period.

The invention has particular application in wireless infrastructure employing wireless communication devices in which power consumption of the whole infrastructure or power consumption of a battery powered device is an issue. Zigbee, Bluetooth and IEEE 802.11 ("WiFi") are examples of wireless protocols that could be used.

PRIOR ART

Such a receiver is known to be used in a low data rate wireless communication network, e.g. operating according to the Zigbee standard (using the IEEE 802.15.4 Medium Access Control layer protocol). The network may be used as a low power wireless sensor or control network, and e.g. applied in home automation, lighting and security, heating, ventilation and air-conditioning systems or industrial automation. These kinds of applications require sensor and control nodes in the network which can be battery operated.

Particularly networks where power resources are limited can benefit from such resources as: antenna array diversity, correction of frequency offset, and preamble detection.

However in low power systems there are premiums and often limitations on resources, and any design must be compromised between the need for optimizing the performance and available resources.

Particularly in very low power systems where energy consumption is a premium and may well be supplied for energy recycling or energy scavenging techniques the demands are very heavily biased in respect of the need for frugality.

Typically an RF networking system will allow a period of training symbols to be transmitted prior to any payload of data so that the intended receiver may identify the upcoming packet and make any adjustments needed in order to minimize the error rate. Likewise the receiver may identify that the signal has no relevance (maybe belonging to another network standard on the same frequency) and take no further part in the transaction—thus saving power.

This period of training symbols, such as a Preamble, is a system overhead and has no other relevance and in itself requires energy to be expended, so must be held to an absolute minimum length in low power systems. A short period of training symbols is in conflict with need for features such as antenna diversity.

Any circuitry designed to perform the needed actions, has on one side to be very economic with energy and so has to be limited in gate count and circuit complexity, but has to perform the operation in a very short time space and with a high degree of accuracy to achieve the maximum performance.

Zigbee is used as an example of a low power mesh networking system where very low power techniques are required to achieve the optimal performance, but a system that has not been created with antenna diversity in mind.

In a radio link in for example a low data rate wireless communication network a part of the attenuation of a signal received at an antenna is caused by multipath fading. The signal from a transmitter is not reaching the antenna by one single signal path, but by a number of signal paths. The signals reaching the antenna by different signal path can have such a phase difference that the sum of the signals is less than one of the signals alone. The use of two or more antenna can reduce this attenuation significantly, by combining the signals of the two or more antenna. A more simple method for using two or more antennas is selecting the antenna with the best signal. The best signal can be defined in several way's; absolute level and signal to noise or interference ratio are two commonly known selection criteria. A figure of 10 dB improvement of the signal can be expected from a two antenna system with an antenna diversity circuit. The advantages of antenna diversity are described in more detail in: Microwave Mobile Communication by William C. Jakes, chapter 6, diversity techniques. ISBN 0-7803-1069-1.

Antenna diversity is based on the evaluation of the signal received at the two or more antennas. This evaluation has to take place on a training or preamble signal of a data message. If a receiver comprises only one receiving circuit the evaluation of the antenna signals could to be done one by one. This requires a longer preamble then would be needed if only one antenna is used to detect the preamble. The preamble is a period in which the available bandwidth in a transmission channel is used for synchronization purposes, but no data is communicated. For optimum bandwidth utilization this "overhead" has to be as small as possible. Furthermore, in a low power network system such as ZigBee, the data message transmitted should comprise as few "overhead" as possible. In the IEEE 802.15.4 standard, the preamble is 8 symbols long, which is short for an antenna diversity system.

SUMMARY OF THE INVENTION

The present invention seeks to provide an improved receiver and method of receiving data symbols having a symbol period.

According to the present invention, a receiver for receiving data symbols having a symbol period with duration SP comprising:

N input terminals for retrieving N antenna signals, wherein in N≧2;

a multiplexer having N inputs coupled to the N input terminals respectively, for selecting the N antenna signals one by one under control of a control signal so as to obtain a combined antenna signal;

a processing unit for performing an autocorrelation function on the combined antenna signal so as to obtain a combined signal;

a demultiplexer for splitting in dependence of the control signal the combined signal into N signals corresponding to the N antenna signals;

N first integrator units for integrating the N signals so as to obtain N integration signals;

a control signal generator for generating the control signal wherein the control signal generator is arranged to generate in a first mode a control signal which enables the multiplexer to select equally in time over a symbol period the N antenna signals and wherein at least one of the N antenna signals is selected more than one time in a symbol period, and wherein the control signal generator is arranged to generate in a second mode in dependence of the N integration signals a control signal which enables the multiplexer to select only one of the N antenna signals.

The invention is based on the following recognition. IEEE 802.15.4 uses a modulation scheme in which the data is mapped in symbols of four bits. Each symbol is defined by a unique code of 32 chips or elements. The symbol rate is 62.5 kHz (period 16 usec), giving a chip rate of 62.5 kHz×32=2 MHz. In an embodiment described below, a sample rate of 16 MHz is used. A preamble consists of an eight times repetition of the same symbol. Thus eight times a pattern of 32 chips or elements is received.

An autocorrelator circuit can be used to detect repeating patterns or signals. Commonly used for antenna diversity is a scheme were sequentially a signal on one of the antennas is evaluated. This evaluation includes detecting that there is a signal present and a measure for the quality of the received signal. The accuracy of the result from an autocorrelation circuit depends on the number of repetitive signals processed. As the preamble comprises only 8 repetitive symbols, it is almost not possible to have an accurate antenna circuit in this way. To obtain a reliably antenna diversity circuit a receiver should process the antenna signals in parallel, which requires two receiving circuits and autocorrelator circuits. This will increase the circuit complexity and power consumption.

It has been found that it is possible to time multiplex the antenna signals and to provide this combined antenna signal to one receiving circuit and autocorrelator circuit, and to demultiplex the result of the autocorrelator signal to obtain for each antenna signal an output signal. According to the invention selects equally in time over a symbol period the antenna signals, wherein at least one of the antenna signals is selected more than one time in a symbol period. In this way, output signals are obtained corresponding to the whole preamble, making it possible to determine the autocorrelation over the eight symbols of the preamble. Which makes it possible to a reliable autocorrelation result. The thus obtained output signals are suitable to determine the antenna with the best autocorrelation, which is assumed to be the antenna signal with the best signals quality. Only one receiving circuit is necessary, which is very economic with respect to circuit complexity and energy consumption.

In a further embodiment the control signal generator is arranged to generate in the first mode a control signal which enables the multiplexer to select recurrently each of the N antenna signals for a period P, wherein P=SP/(N×M) and M being an integer≧2. This feature allows to reduce the influence of distortions in the transmitted signal on the accuracy of the antenna diversity circuit. By increasing the switching between the respective antennas, the distortion will be spread over the respective antennas, so as to contribute equally in the output signals of the corresponding antennas. In this way distortions will determine immediately which antenna will be selected. In an embodiment the receiver switches to the second mode after receiving a predetermined number of symbols in the first mode and/or after the value of one of the integrator units exceeds a predefined threshold. The more symbols are used, the more distortions are averaged over the received symbols, resulting in a more accurate decision with respect the quality of the antenna signals. However, if one of the integrators exceeds a predetermined threshold, this is an indicator that the antenna signal received via corresponding antenna has a good quality and that said antenna should be selected. This enables to select one or the antennas prior to the predetermined number of symbols is received, which further improves the performance of the receiver.

In an embodiment the processing unit comprises a delay unit for delaying the combined antenna signal for a symbol period to obtained a delayed combined antenna signal; and a multiplication unit for multiplying the combined antenna signal with the delayed combined antenna signal to obtain an autocorrelation signal to be supplied to an output of the multiplication unit, wherein the output of the multiplication unit is coupled an output of the processing unit for supplying the combined signal. Usage of this feature enables to implement very efficiently an autocorrelator function. In normal operation the receiver will communicate with one transmitted having a symbol period. The receiver will lock to this symbol frequency. As soon as the receiver is locked to the symbol frequency, the delay of the delay unit corresponds to the symbol period, enabling to perform efficiently the autocorrelation function.

In a further embodiment, the processing unit further comprises an integrator unit for integrating subsequent samples of the autocorrelation signal under control of the control signal. This feature enables to reduce the power dissipation in the receiver. The processing unit performs for subsequent samples of an antenna signal an integration function. The result of this integration is supplied to the respective one of the N first integrator units. The integrator unit in the processing unit is running at a relative high clock frequency, whereas the first integrator units only has to add a value when the processing unit supplies the integrator result. The integrator unit in the processing unit can be simple with a reduced word length, which will consequently consume less power than a first integrator unit with larger word length running at said high clock frequency.

In an embodiment the processing unit comprises an output for supplying an autocorrelation signal, wherein the receiver further comprises a preamble detection unit for detecting a preamble in the autocorrelation signal. It has been found that the combined antenna signal is still suitable for preamble detection, while the signal to noise ratio of the combined antenna signal is less than the signal to noise ratio of a single antenna signal. This has the advantage that one receiving circuitry can perform training functions such as antenna diversity and preamble detection at the same time. By using an autocorrelator for preamble detection it is possible to discriminate between a preamble and noise. The longer the integration period, the better the discrimination.

In another embodiment of the invention the processing unit comprises N autocorrelators for generating N autocorrelation signals, the N autocorrelators having frequency responses which are shifted with respect to each other, the receiver further comprises a fine frequency offset determining unit for determining a fine frequency offset in dependence of the N autocorrelation signal. It has been found that the combined antenna signal is suitable to determine a frequency offset with respect to the intermediate frequency IF. As the antenna signals receive the same signal but with different time delay, a correlation of the combined antenna signal with a version of the symbol delayed version can be performed to determine a frequency offset smaller than half the symbol frequency. This embodiment has the advantage that one receiving circuitry can perform training functions such as antenna diversity and frequency offset estimation at the same time on the same signal.

In another embodiment of the receiver the processing unit comprises M code correlators for generating M correlation signals, the M code correlators having center frequencies which differ a multiple of the symbol rate, the receiver further comprises a coarse frequency offset determining unit for determining a course frequency offset in dependence of the M correlation signal. This embodiment has the advantage that one receiving circuitry can perform training functions such as antenna diversity and frequency offset estimation at the same time on the same signal. The use of the additional correlators enables to determine a frequency offset of a multiple of the symbol frequency.

In a further aspect, the present invention relates to a method of receiving data symbols having a symbol period with duration SP comprising:

retrieving N antenna signals, wherein in N≧2;

selecting the N antenna signals one by one under control of a control signal so as to obtain a combined antenna signal;

performing an autocorrelation function on the combined antenna signal so as to obtain a combined signal;

splitting in dependence of the control signal the combined signal into N signals corresponding to the N antenna signals;

integrating the N signals so as to obtain N integration signals;

generating in a first mode a control signal which enables to select equally in time over a symbol period the N antenna signals and wherein at least one of the N antenna signals is selected more than one time in a symbol period, and generating in a second mode in dependence of the N integration signals a control signal which enables to select only one of the N antenna signals.

SHORT DESCRIPTION OF DRAWINGS

The present invention will be discussed in more detail below, using a number of exemplary embodiments, with reference to the attached drawings, in which FIG. 1 shows a simplified block diagram of an embodiment of a receiver according to the present invention;

DETAILED DESCRIPTION OF EXEMPLARY EMBODIMENTS

Figure 1:
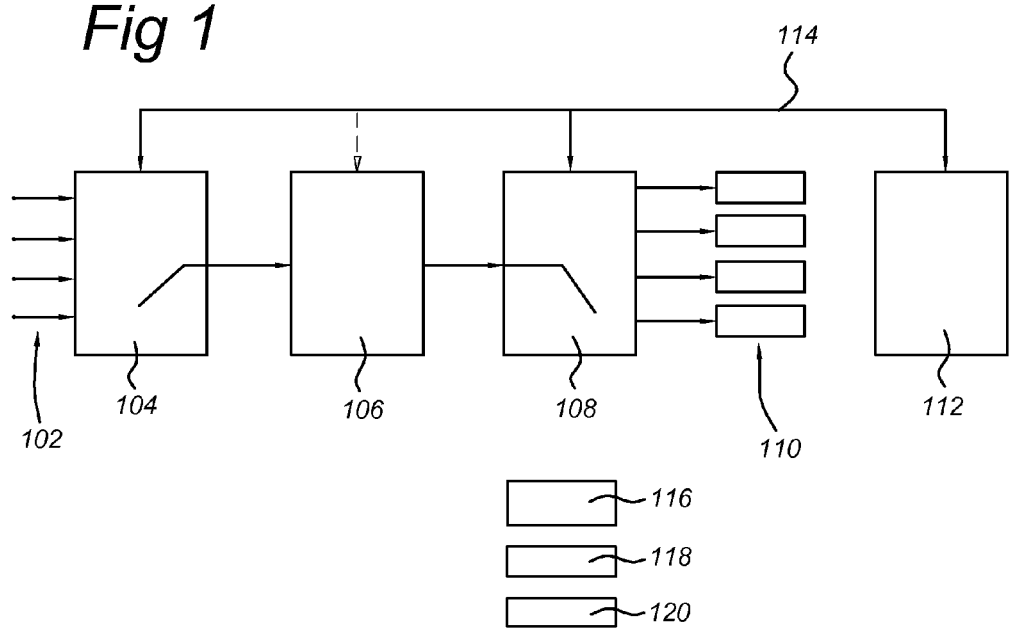

FIG. 1 shows a simplified block diagram of an embodiment of a receiver according to the present invention. The receiver comprises N input terminals 102 coupled to N antennas, not shown, for retrieving N antenna signals, wherein N≧2. In FIG. 1, four input terminals are shown. The N input terminals are coupled to N input terminals of a multiplexer 104. The multiplexer 104 is arranged to select the antenna signals one by one under control of a control signal 114 so as to obtain a combined antenna signal to be supplied to an output of the multiplexer. The combined antenna signal is supplied to a processing unit 106 for performing an autocorrelation function on the combined antenna signal to obtain a combined signal. It should be noted that in an embodiment of the receiver the processing unit 106 comprises the analog part of the receiver and the circuit used to shift the received signals in frequency to compensate for frequency offset. The combined signal is supplied to a demultiplexer 108 arranged for splitting under control of the control signal 114 the combined signal into N signals. Each of the N signals corresponds to one of the N antenna signals. The N signals are supplied to N first integrator units 110 for integrating the N signals to obtain N integration signals. The N integration signals are supplied to a control signal generator unit 112. The control signal generator unit 112 generates a control signal 114 for controlling the multiplexer 104 and the demultiplexer 108.

In a training mode the control signal generator unit 112 generates a control signal 114 which enables the multiplexer to select equally in time over a symbol period the N antenna signal. Furthermore at least one of the antenna signals is selected more than one time in a symbol period. This means that the sum of the periods that an antenna is selected within a symbol period is equal for each antenna. In principle the selection can be done randomly, however it is an advantageous implementation to select recurrently each of the N antenna signals for a period P, wherein P=SP/(N×M), wherein SP is the symbol period, N is the number of antennas and M is the number of times each of the antenna signals is selected in a symbol period.

For example IEEE 802.15.4 uses a modulation scheme in which the data is mapped in symbols of four bits. Each symbol is defined by a unique code of 32 chips or elements. The symbol rate is 62.5 kHz (symbol period SP=16 μsec), giving a chip rate of 62.5 kHz times 32 is 2 MHz. In a practical realisation of the receiver, a sample rate of 16 MHz is used, so 256 samples per symbol. If the number of antennas N is two and the value of M=2, the control signal enables to alternately select for 4 μsec the first antenna signal and the second antenna signal.

As soon as a decision can be made which antenna provides the best signal, the receiver switches to a normal mode. In this mode one of the antenna signals will be selected based on the N integration signals of the N first integrator units 110. The value of the N integration signals is a measure of the quality of the respective antenna signal. The switch from the training mode to the normal mode can be performed at the instant a predefined number of symbols has been received. In IEEE 802.15.4, this number could be in the range of 4-8. The upper limit is defined by the number of repetitions of subsequent symbols in the preamble. According to IEE 82.15.4 the preamble consists of an eight times repetition of the same symbol. Each symbol contains 32 chips ore elements. For the preamble, the data code 0 chip sequence is used (see IEEE 802.15.4-2003, 6.5.2.3 Symbol-to-chip mapping for the actual code). Then the antenna corresponding to the integrator unit having the highest integration value is selected.

The switch from training mode to normal mode could also be performed when integration signal of one of the integrator units 110 exceeds a predetermined value. In that case the antenna corresponding the integrator unit which exceeds first the predefined value will be selected. The exceeding of the predefined value is an indication that the corresponding antenna signal has a sufficient signal quality to perform data processing of the subsequent symbols of a data message.

The receiver further comprises a preamble detection unit 116 for detecting a preamble in an autocorrelation signal, a fine frequency offset determining unit 118 for determining a fine frequency offset in dependence of N autocorrelation signals being generated in the processing unit 106 and a coarse frequency offset determining unit 120 for determining a coarse frequency offset in dependence of M correlation signals generated in the processing unit 106. The methods of preamble detection and fine/coarse offset determining will be described in more detail hereafter.

Figure 2:
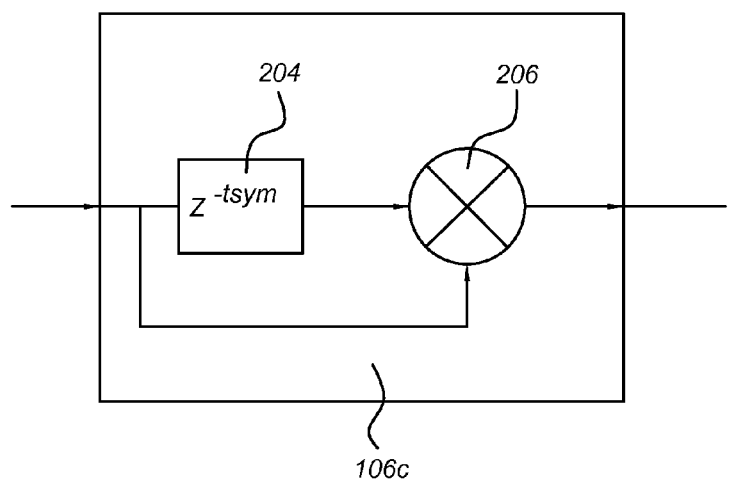
FIG. 2 shows a simplified block diagram of a first embodiment of a processing unit for a receiver according to the present invention.

FIG. 2 shows a simplified block diagram of a first embodiment of a processing unit 106 for a receiver according to the present invention. The processing unit 106 comprises a delay unit 204 for delaying the combined antenna signal for a symbol period to obtain a delayed combined antenna signal. The combined antenna signal and delayed combined antenna signal are multiplied with each other by a multiplication unit 206 to obtain an autocorrelation signal. The autocorrelation signal is supplied to the output of the processing unit 106.

Figure 3:
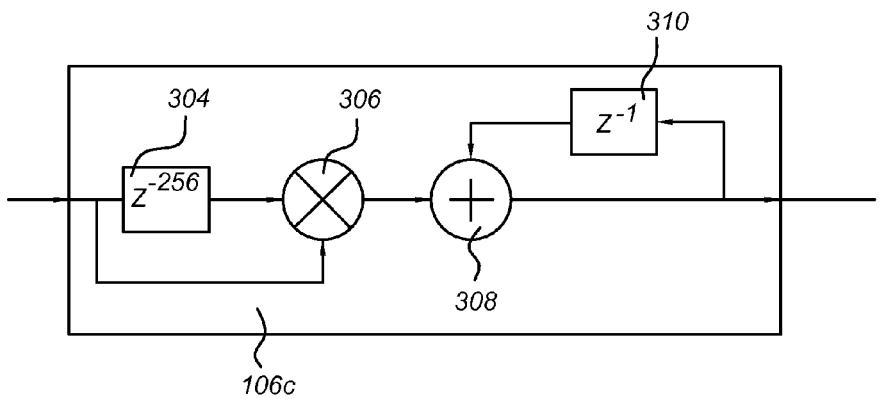
FIG. 3 shows a simplified block diagram of a second embodiment of a processing unit according to the present invention.

FIG. 3 shows a simplified block diagram of a second embodiment of a processing unit 106 according to the present invention. In this embodiment is assumed that 256 samples per symbol period SP are obtained. In this case, the delay unit 304 realizes a symbol period delay time. By multiplying the input signal and the delayed signals with each other by means of an multiplication unit 306 an autocorrelation function is performed and an autocorrelation signal is obtained. Subsequently, the autocorrelation signal is supplied to an integration unit comprising an adder 308 and an one clock cycle delay unit 310. Under control of the control signal, the integration value is the integration unit is set to zero. In this way, the integrator unit integrates subsequent samples of the autocorrelation signal corresponding to the same antenna signal.

Figure 4:
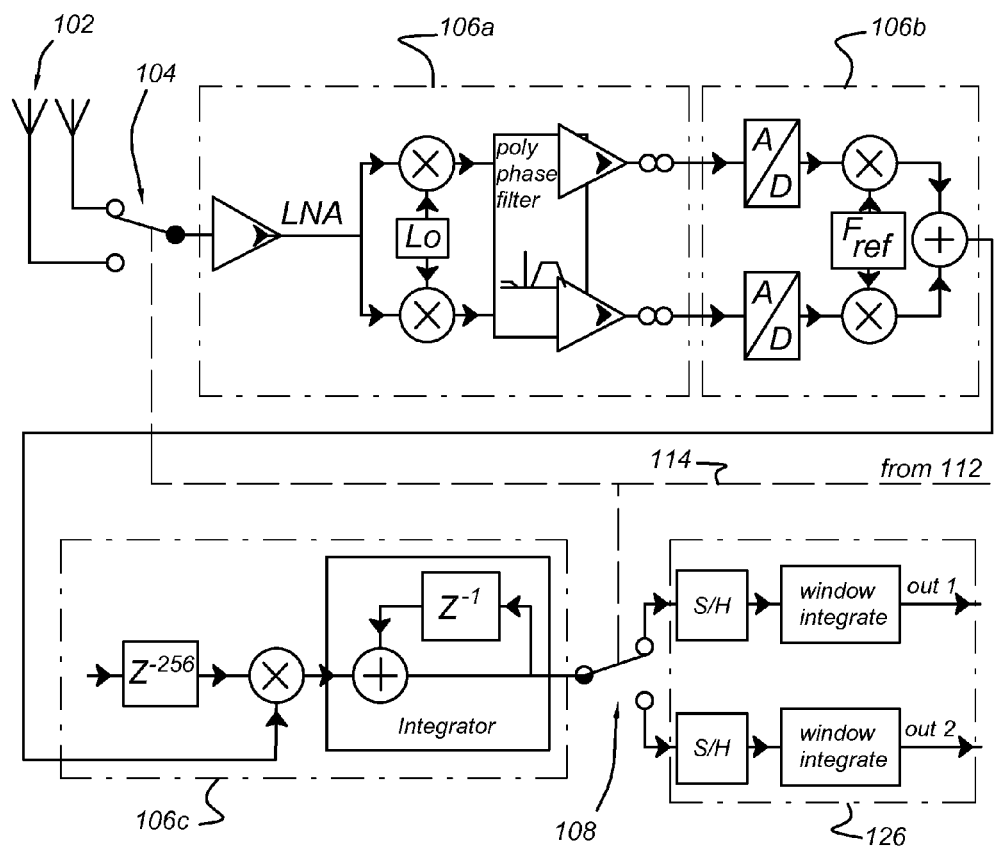
FIG. 4 shows a more detailed block diagram of an embodiment of a receiver according to the invention.

FIG. 4 shows a more detailed block diagram of an embodiment of a receiver according to the invention. The upper part of the diagram shows the analog part 106a of the receiver and the circuit used to shift the received signal in frequency to compensate for frequency offset. In the lower part the autocorrelator can be seen. The integration function is divided between a first integrator in processing unit block 106c and two window integrator units in window integrator block 126. One window integrator unit for each antenna. In this embodiment the processing unit according to FIG. 1 comprises the circuitry between the multiplexer and demultiplexer.

The signal of the selected antenna is amplified by a low noise amplifier LNA. The output of the LNA is shifted in frequency to center around the IF frequency. Simple mixing (multiplication) of a signal with a single tone (in this case the output of the LO) results in a double spectral output. One of the signals generated by the simple mixing is centered around the desired IF and the other one is centered around –IF. In practice this means that the receiver would be not be able to distinguish between an input at $F_{LO}-F_{IF}$ and $F_{LO}+F_{IF}$. By using an LO with a complex output (sine and cosine output) and mixing the input signal with these two LO outputs, we obtain a complex signal on which distinction can be made between the positive and negative spectral components. A property of the polyphase filter after the mixers is to suppress one of the two spectral components.

The complex output of the polyphase filter is retained through the IF stage in to the digital domain, to allow a frequency shift to remove the frequency offset. In principle, the frequency offset can be removed by changing the LO frequency, but the solution shown here is more practical as in the digital domain this function can be implemented more efficiently.

The outputs of the polyphase filter are amplified by hard limiting amplifiers and quantized by the analogue to digital converters to deliver a single bit representing the sign of the input signal of the hard limiting amplifiers. The single bit signal is multiplied with a signal having a frequency $F_{ref}$. $F_{ref}$ is a complex signal generator which is to be set to minus a frequency offset value to compensate the frequency offset. The results of the fine and coarse frequency offset estimation are used to set this frequency. Since the rest of the signal processing takes place with a IF still present, only the real part of the signal is needed for further processing.

The receiver as described above is just an example and other receiver concepts could be used.

Figure 9:
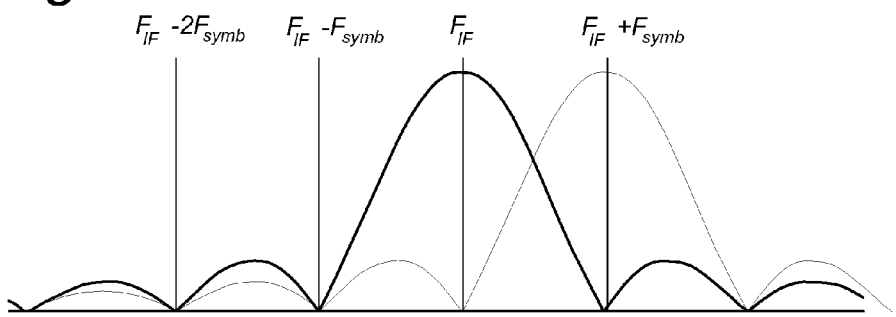
FIG. 9 shows an example of the frequency response of two code correlators in parallel.

The delay line used in the autocorrelator in FIG. 4 (the Z-256 block) contains a signal of one autocorrelation period ago. If we now switch between antenna in such a way that both (or more) antenna are selected over a period equal to the delay period, we can get two (or more) autocorrelation results over a single symbol period. FIG. 9 will disclose this in more detail.

Figure 5:
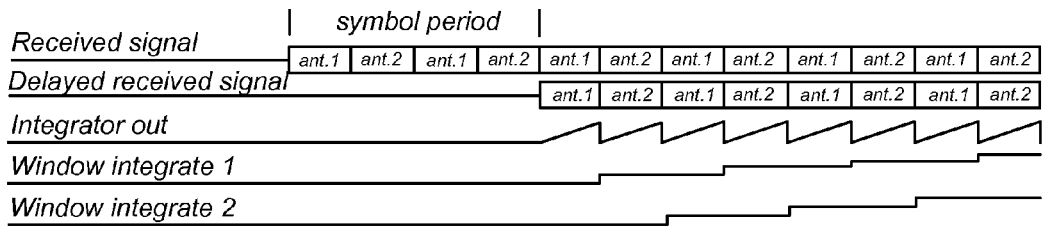
FIG. 5 shows schematically the operation of the receiver according to the invention.

FIG. 5 shows schematically the operation of the receiver according to the invention disclosed in FIG. 4. The control signal enables the multiplexer to select alternately $\frac{1}{4}^{th}$ of the symbol period the first antenna signal and $\frac{1}{4}^{th}$ of the symbol period the second antenna signal. In this way the period in which the first antenna signal and second antenna signal is divided equally over the symbol period, namely half of the symbol period. The integrator unit in the processing unit is used to produce an output value at four times the symbol rate. So the integrator is integrating the value of 64 samples, as a sample period has 256 samples. At the end of the integration period, the result is stored in the window integrator and the integrator is reset to zero. In this way during one symbol period the window integrator unit of each of the two antennas will obtain two integration values, which correspond to the integration of 64 subsequent output samples of the autocorrelator. It should be noted that not all signals in the diagram are on scale and only when the correlation is very good, such a triangular shape is coming out of the integrator. The window integrator averages over four integration results, each corresponding to the averaging of 64 samples, making it possible to obtain in the window intergrators a value corresponding to the average of 128 samples per symbol period.

In principle, each antenna needs a certain averaging period, independent of the number of antennae used. In the above example it takes a symbol period to fill the delay line and four symbols to completely fill the window integrators. So the whole function takes no more then five symbol periods. Often a preamble could be detected on less then five symbols. When a window integrator exceeds a threshold, this is an indication that in one of the N antenna signals a preamble is detected. This threshold is chosen such that it high enough not to trigger on a very noisy signal. When the noise is less, this threshold will be exceeded sooner.

When only one antenna was used, in principle only a maximum of three symbols would be needed. It is also possible to make a trade off between the gain of antenna diversity and the reduced sensitivity for preamble detection if less samples are used for autocorrelation (for each antenna). So, it would be possible to use more then two antennas and leave the period the training function takes the same.

The above circuit functions in a pseudo parallel mode, that makes it very efficient. For the whole training it is efficient that preamble detection, antenna diversity and a large part of the frequency offset estimation take place in parallel. For complexity and power consumption is it is of benefit that the three mentioned functions all use the same basic circuit.

Figure 6:
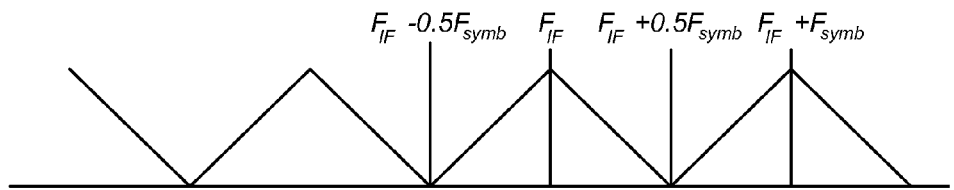
FIG. 6 shows a frequency response of an autocorrelator as shown in FIG. 3.

FIG. 6 shows a frequency response of an autocorrelator as shown in FIG. 3. A property of the autocorrelator is that it is frequency sensitive. This property is used for frequency offset estimation. Furthermore, the frequency response repeats at the symbol rate $F_{symb}$.

Figure 7:
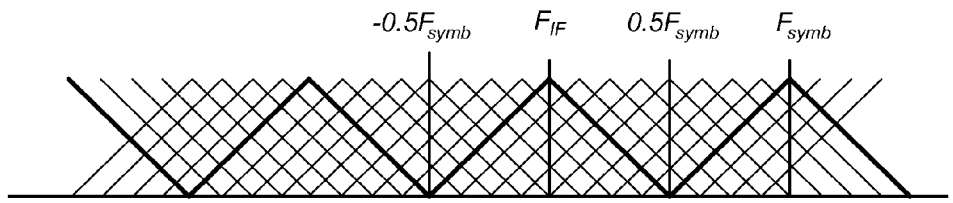
FIG. 7 shows a frequency response of eight autocorrelators, each shifted by $\frac{1}{8}^{th}$ of the symbol rate.

FIG. 7 shows a frequency response of eight autocorrelators, each shifted by $1/8^{th}$ of the symbol rate. The output values of the eight autocorrelators could be used to determine a frequency offset. The autocorrelator which gives the highest output signal indicates that the frequency of the combined antenna signal matches the best with the frequency response of the corresponding autocorrelator. However, as the spectral response of the autocorrelator repeats at he symbol rate $F_{symb}$, it is not possible to use the eight autocollrelators to estimate the complete frequency offset. Only, a frequency offset smaller than then half the symbol rate can be estimated. The autocorrelator is used to correct the frequency offset near to a remaining frequency offset, which is a multiple of the symbol rate ($\ldots F_{IF}-F_{symb}$, $F_{IF}$, $F_{IF}+F_{symb}$, $F_{IF}+2\times F_{symb}$, etc). The estimated frequency offset by means of the autocorrelators corresponds to the frequency shift of the autocorrelator with the highset output value. It should be noted that the autocorrelation and the preamble detection can be performed simultaneously with the autocorrelators.

As an example: say that the total frequency offset of the combined antenna signal is 148 kHz and the Symbol Frequency $F_{symb}$ is 62.5 kHz. By means of the autocorrelator an offset of 148 kHz will be seen as a frequency offset of 148-$2\times F_{symb}$=23 kHz. The autocorrelator with a frequency shift of $3\times F_{symb}$=23.4 kHz will provide the highest out put value. The offset of the combined antenna can then be compensated with 23.4 kHz resulting in a remaining offset of 148-23.4=124.6 kHz, which is close to two times the symbol rate (=125 kHz). In this way a fine frequency offset determining unit can be obtained for determining a fine frequency offset in dependence of N autocorrelator signal, wherein N the number of autocorrelators is having a shifted frequency offset.

For the interpretation of symbols, parallel correlators can be used. A correlator can be realized with a Finite Impulse Response (FIR) filter structure. The coefficients could be obtained by a data code 0 chip sequence convoluted with the IF frequency.

Figure 8:
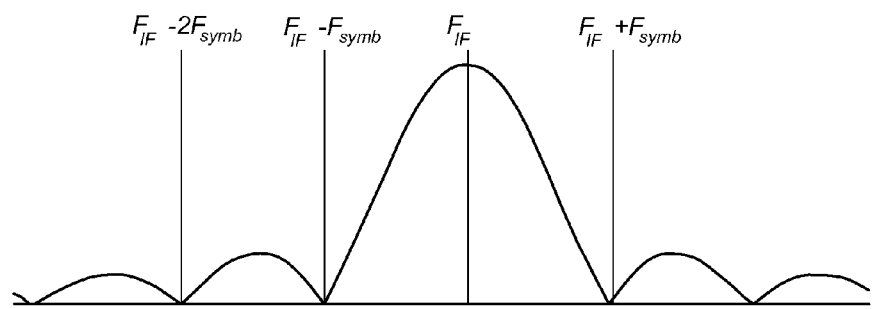
FIG. 8 shows a frequency response of a code correlator.

FIG. 8 shows a frequency response of a code correlator. This frequency response is the response for the center frequency $F_{IF}$ of the combined antenna signal. The frequency response of the combined antenna signal is much wider then the response shown in FIG. 8. The frequency response has a maximum at the IF frequency $F_{IF}$ and a minimum at the IF frequency plus or minus a multiple of the symbol rate $F_{IF}\pm F_{symb}$. If a signal is supplied to the correlator in FIG. 8 with a frequency $F_{IF}\pm F_{symb}$, the output signal will be zero or at least very small.

By using more than one correlator, having a center frequency at $F_{IF}\pm F_{symb}$ a coarse frequency estimation can be realised. FIG. 9 shows an example of the frequency response of two code correlators in parallel. One with a center frequency $F_{IF}$ and one with $F_{IF}+F_{symb}$. With a number of these correlators in parallel, the remaining part of the total frequency offset can be detected. The correlator which provides a signal with the highest output determines the remaining part of the frequency offset. The remaining part of the frequency offset corresponds the center frequency of the correlator minus the frequency $F_{IF}$. In the example given above with a total frequency offset of 148 kHz, the correlator that contains the preamble code convoluted with $F_{IF}+2\times F_{symb}$ will give the best correlation and thus the highest output value.

Figure 10:
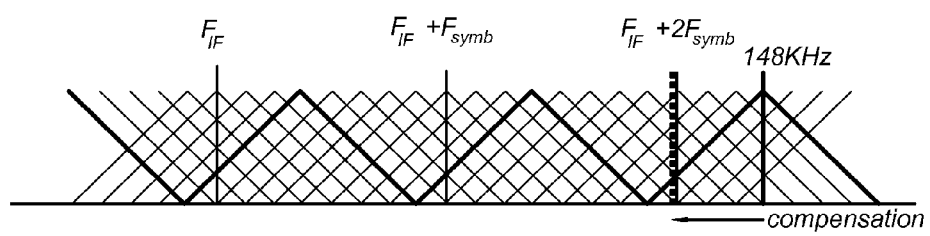
FIG. 10 shows graphically the first step to correct a frequency offset.

FIG. 10 shows graphically the first step to correct a frequency offset which is the fine frequency offset correction. The autocorrelation function with the bold frequency response has a correlation maximum closest to 148 kHz and will consequently the highest output value. After determining the fine frequency offset estimation, the whole spectrum of the signal supplied to the autocorrelator and code correlator is shifted $-23.4$ kHz ($=3/8^{th}\times F_{symb}$). After this compensation, the center frequency of the signal supplied to the code correlator is 124.6 kHz. A frequency shift can be realized in the circuit of FIG. 4 by modifying the value of $F_{ref}$ of the complex signal generator.

Figure 11:
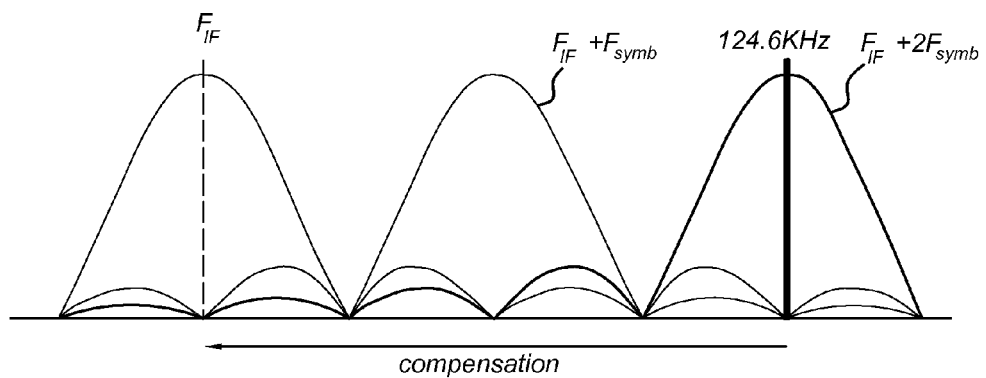
FIG. 11 shows graphically the second step to correct a frequency offset.

FIG. 11 shows graphically the second step to correct a frequency offset. The remaining part of the offset results in that the code correlator with center frequency $F_{IF}+2\times F_{symb}$ provides an output signal with the highest value. The signal is consequently corrected by shifting it over $-125$ kHz. Finally, the remaining signal is a signal centered around $-0.4$ kHz.

In an embodiment of an IEEE 802.15.4 receiver, eight code correlators are used in parallel. In this way a frequency offset range of about 8 times 62.5 kHz is $\pm 250$ kHz is covered. It might be clear that the frequency offset estimation resolution is determined by the number of autocorrelators used, and is with eight autocorrelators slightly better then 4 kHz, which corresponds to half the symbol rate $F_{symb}$ divided by eight.

Several embodiment of the present invention have been described above by way of exemplary embodiments. Various modifications and variations for the elements described with respect to these embodiments may be made by the skilled person without departing from the scope of the present invention, which is defined by the appended claims.

The invention claimed is:

1. A receiver for receiving data symbols having a symbol period with duration SP, wherein SP is the symbol period duration, comprising:
   N input terminals for retrieving N antenna signals, wherein in $N \geq 2$;
   a multiplexer having N inputs coupled to the N input terminals respectively, for selecting the N antenna signals one by one under control of a control signal so as to obtain a combined antenna signal;
   a processing unit for performing an autocorrelation function on the combined antenna signal so as to obtain a combined signal;
   a demultiplexer for splitting in dependence of the control signal the combined signal into N signals corresponding to the N antenna signals;
   N first integrator units for integrating the N signals so as to obtain N integration signals;
   a control signal generator for generating the control signal wherein the control signal generator is arranged to generate in a first mode a control signal which enables the multiplexer to select equally in time over a symbol period the N antenna signals and wherein at least one of the N antenna signals is selected more than one time in a symbol period, and wherein the control signal generator is arranged to generate in a second mode in dependence of the N integration signals a control signal which enables the multiplexer to select only one of the N antenna signals.

2. The receiver as claimed in claim 1 wherein the control signal generator is arranged to generate in the first mode a control signal which enables the multiplexer to select recurrently each of the N antenna signals for a period P, wherein $P=SP/(N\times M)$ and M being an integer$\geq 2$, wherein M represents a number of times during the SP at which the multiplexer selects each antenna for the period P.

3. The receiver as claimed in claim 1 or 2, wherein the receiver switches to the second mode after receiving a predetermined number of symbols in the first mode.

4. The receiver as claimed in claim 1, wherein the processing unit comprises a delay unit for delaying the combined antenna signal for a symbol period to obtained a delayed combined antenna signal; and a multiplication unit for multiplying the combined antenna signal with the delayed combined antenna signal to obtain an autocorrelation signal to be supplied to an output of the multiplication unit, wherein the output of the multiplication unit is coupled an output of the processing unit for supplying the combined signal.

5. The receiver as claimed in claim 4 wherein the processing unit further comprises an integrator unit for integrating subsequent samples of the autocorrelation signal under control of the control signal.

6. The receiver as claimed in claim 1, wherein the processing unit comprises an output for supplying an autocorrelation signal, wherein the receiver further comprises a preamble detection unit for detecting a preamble in the autocorrelation signal.

7. The receiver as claimed in claim 1, wherein the processing unit comprises N autocorrelators for generating N autocorrelation signals, the N autocorrelators having frequency responses which are shifted with respect to each other, the receiver further comprises a fine frequency offset determining unit for determining a fine frequency offset in dependence of the N autocorrelation signals.

8. The receiver as claimed in claim 1, wherein the processing unit comprises M code correlators for generating M correlation signals, the M code correlators having center frequencies which differ a multiple of the symbol rate, the receiver further comprises a coarse frequency offset determining unit for determining a coarse frequency offset in dependence of the M correlation signal.

* * * * *